Nov. 23, 1926.  V. E. SHAKESPEARE  1,608,437
BRAKE BAND
Filed July 7, 1926
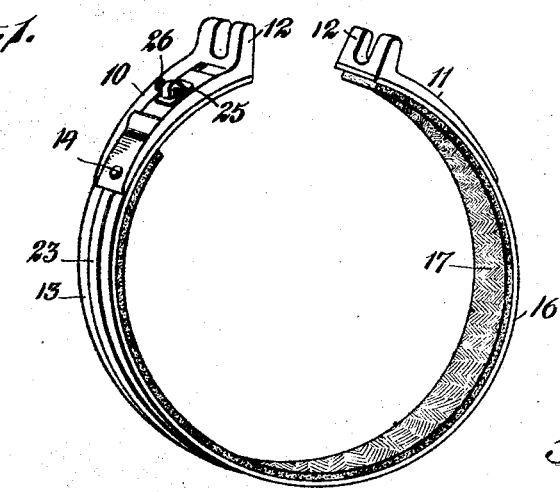
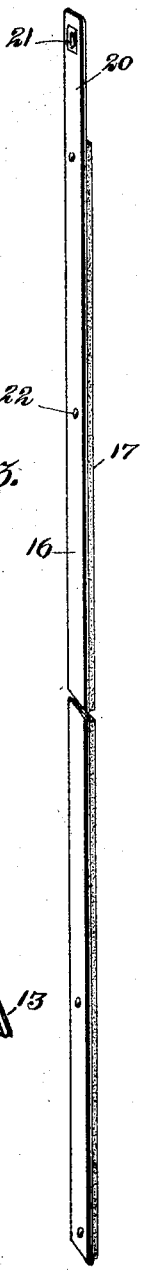
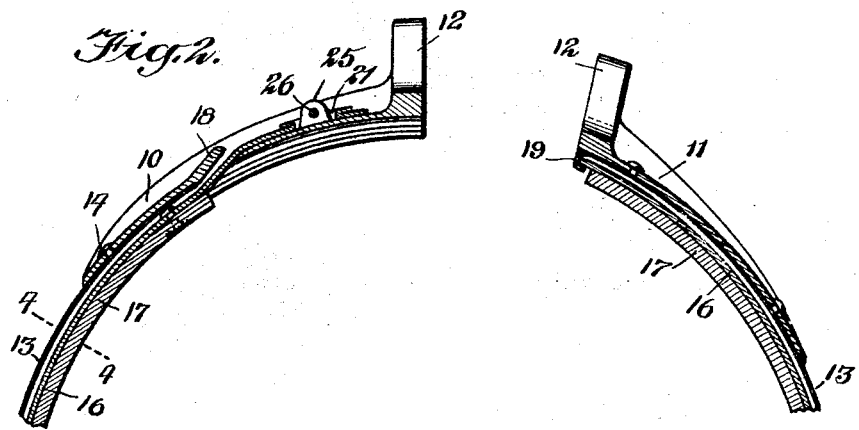
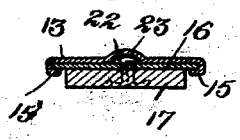
WITNESSES
INVENTOR
Valentine E. Shakespeare
BY
ATTORNEYS Patented Nov. 23, 1926.

1,608,437

UNITED STATES PATENT OFFICE.

VALENTINE E. SHAKESPEARE, OF NEW YORK, N. Y.

BRAKE BAND.

Application filed July 7, 1926. Serial No. 121,005.

The present invention is concerned with improved means for detachably mounting a brake lining in a brake band so that linings may be removed and replaced with expedition and facility.

An object of the invention is to provide a brake band of the character noted above which will be simple and practical in construction, rugged and durable in use and comparatively economical to manufacture, and in which the lining may be removed and replaced in a few minutes without requiring the services of an expert mechanic.

With the above noted and other objects in view, the invention consists in certain novel features of construction, and combinations and arrangements of parts, as will be more fully hereinafter set forth and pointed out in the claims. The invention may be more fully understood from the following description in connection with the accompanying drawings, wherein—

Figure 1 is a perspective view of a brake band embodying the present invention;

Figure 2 is a fragmentary, longitudinal sectional view through the band brackets and their associated mechanism;

Figure 3 is a broken perspective view of the removable band lining and its flexible backing plate;

Figure 4 is a transverse, sectional view on the line 4—4 of Figure 2.

In the drawings I have used the reference numerals 10 and 11 to designate the brake band brackets of generally conventional shape terminating at their ends in the usual bifurcated lugs 12. A brake band 13 is riveted at 14, or otherwise permanently secured to the tails of the brackets. In accordance with the present invention this brake band, as best seen in Figure 4, is of channeled formation, having its edges turned inwardly at 15 to provide channeled guides for the reception of the edges of a flexible carrier member 16 for the band lining 17.

The brake band 13 terminates approximately under the central portion of the band bracket 10, the end of the brake band being disposed at the inner end of an inclined slot 18 which extends from the inner to the outer face of the bracket and through which the lining carrier strip is threaded in a manner to be later described. The band extends under approximately the entire length of the bracket 11 and terminates at the lugs of said bracket in a downwardly turned lip or flange 19 which acts as a stop to limit the threading movement of the lining carrier into the channeled band.

As best seen in Figure 3 the carrier member 16 is in the nature of a strip of highly flexible spring steel, one end of which extends beyond the lining member 17 at 20 and is formed with an eyelet or opening 21. The lining 17 is secured to the carrier 16 in any appropriate manner, as by the use of rivets 22 and the band 13 may be formed with a central groove 23 for the accommodation of the heads of the rivets.

The manner of applying the lining and its removable carrier strip is to insert the end of the lining through slot 18 in the bracket 10, thereby engaging the projected edges of the carrier in the channeled portions 15 of the band. The carrier is sufficiently free so that it may be forced into the band manually by grasping its projecting end and pushing it into the slot 18. The lip 19 serves as a stop to engage the inner end of the carrier strip 16 and limit the insertion of the carrier strip into the channeled band. At this time the eyelet 21 will be alined with a lug 25 on the outer face of the bracket 10. The eyelet is dropped over the lug and a cotter pin or equivalent securing device 26 slipped through the lug to secure the lining and its carrier in position.

The operation in removing the carrier and lining is exactly the reverse of that just described and it will be apparent from the foregoing description that linings may be removed and replaced in a very short space of time without requiring the services of a skilled mechanic.

Various changes and alterations might be made in the general form and arrangement of parts described without departing from the invention. Hence I do not wish to limit myself to the details set forth, but shall consider myself at liberty to make such changes and alterations as fairly fall within the spirit and scope of the appended claims.

What I claim is:

1. A channeled brake band, brackets secured to the ends thereof, a flexible spring metal carrier strip in the channel having one end extending through a slot in one of the brackets, and a lining secured to the carrier strip.

2. A channeled brake band, brackets secured to the projecting ends thereof, a flexible spring metal carrier strip in the channel having one end extending through a slot in one of the brackets, and a lining secured to the carrier strip, said bracket having a lug on its outer face entering an opening in the projecting end of the carrier strip.

3. A channeled brake band, brackets secured to the projecting ends thereof, a flexible spring metal carrier strip in the channel having one end extending through a slot in one of the brackets, and a lining secured to the carrier strip, said bracket having a lug on its outer face entering an opening in the projecting end of the carrier strip, and a retaining member associated with the lug for holding the carrier strip against accidental disengagement from the lug.

4. A channeled brake band, brackets secured to the ends thereof, a flexible spring metal carrier strip in the channel having one end extending through a slot in one of the brackets, and a lining secured to the carrier strip, one end of the band being turned inwardly to constitute a stop limiting the entrance of the carrier strip into the channel.

5. A brake band, brackets attached to the ends thereof, one of said brackets having an inclined slot extending therethrough, a flexible, spring metal carrier strip removable through said opening and guided and backed by the band, and a lining carried by said strip.

6. A brake band, brackets attached to the ends thereof, one of said brackets having an inclined slot extending therethrough, a flexible, spring metal carrier strip removable through said opening and guided and backed by the band, and a lining carried by said strip, one end of said strip overlying and being detachably secured to the outer face of the slotted bracket.

7. A brake band, brackets attached to the ends thereof, one of said brackets having an inclined slot extending therethrough, a flexible, spring metal carrier strip removable through said opening and guided and backed by the band, and a lining carried by said strip, said band having its edges turned inwardly and defining guiding channels for the edges of the carrier strip.

8. A brake band as set forth in claim 7 and wherein the lining is riveted to the carrier and a groove in the band accommodates the heads of the rivets.

9. A channeled brake band, brackets secured to the ends thereof, a flexible carrier strip in the channel having one end extending through a slot in one of the brackets, and a lining carried by the carrier strip.

VALENTINE E. SHAKESPEARE.